US010755553B2

(12) United States Patent
Kennedy-Foster et al.

(10) Patent No.: US 10,755,553 B2
(45) Date of Patent: Aug. 25, 2020

(54) COLLABORATIVE ALARM MONITORING SYSTEM AND METHOD

(71) Applicant: CARRIER CORPORATION, Jupiter, FL (US)

(72) Inventors: Ashley Kennedy-Foster, Henrietta, NY (US); Ben Holm, Farmington, NY (US); Michael Yudichak, Fairport, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/313,938

(22) PCT Filed: Jun. 29, 2017

(86) PCT No.: PCT/US2017/040033
§ 371 (c)(1),
(2) Date: Dec. 28, 2018

(87) PCT Pub. No.: WO2018/005815
PCT Pub. Date: Jan. 4, 2018

(65) Prior Publication Data
US 2019/0164412 A1 May 30, 2019

Related U.S. Application Data

(60) Provisional application No. 62/356,886, filed on Jun. 30, 2016.

(51) Int. Cl.
*G08B 25/14* (2006.01)
*G08B 13/196* (2006.01)
*H04L 12/58* (2006.01)

(52) U.S. Cl.
CPC ....... *G08B 25/14* (2013.01); *G08B 13/19656* (2013.01); *G08B 13/19682* (2013.01);
(Continued)

(58) Field of Classification Search
None
See application file for complete search history.

(56) References Cited

U.S. PATENT DOCUMENTS 6,337,858 B1 * 1/2002 Petty ................ H04M 3/42153
370/356
7,383,291 B2 6/2008 Guiheneuf et al.
(Continued)

FOREIGN PATENT DOCUMENTS

CN 203825689 U 9/2014

OTHER PUBLICATIONS

International Search Report and Written Opinion for International Application No. PCT/US2017/040033, Application Filing Date Jun. 29, 2017; dated Sep. 5, 2017 (12 pages).

*Primary Examiner* — Chico A Foxx
(74) *Attorney, Agent, or Firm* — Cantor Colburn LLP

(57) ABSTRACT

A collaborative alarm monitoring system (100) includes a security system host server (106) and a chat session server (116). The security host server is in signal communication with at least one security panel (102A, 102B) to receive an alert signal in response to a detected alarm event. The chat session server is in signal communication with the security system host server and is configured to store a chat session protocol and software that when executed by a hardware processor executes a chat session. A monitoring device (110A, 110B, 110C) alerts an operator of the alarm event in response to receiving the alert signal. The monitoring device includes a chat session client that generates a chat session interface to display an alarm event thread indicative of the alarm event. The chat session server generates a communication stream for each alarm event, and the communication stream is individually displayed on the chat session interface of the monitoring device.

18 Claims, 5 Drawing Sheets

(52) U.S. Cl.
CPC ...... G08B 13/19691 (2013.01); H04L 51/046 (2013.01); H04L 51/16 (2013.01)

(56) References Cited

U.S. PATENT DOCUMENTS

| | | | |
|---|---|---|---|
| 8,005,937 | B2 | 8/2011 | Wesley et al. |
| 8,453,159 | B2 | 5/2013 | Appelbaum et al. |
| 8,730,029 | B2* | 5/2014 | Petricoin, Jr. ............ H04N 7/14 |
| | | | 340/539.11 |
| 8,744,246 | B2 | 6/2014 | Dufosse et al. |
| 8,890,685 | B1* | 11/2014 | Sookman ............ G08B 25/008 |
| | | | 340/539.13 |
| 8,896,435 | B2 | 11/2014 | Philip et al. |
| 8,966,445 | B2 | 2/2015 | Ahlgren et al. |
| 9,014,661 | B2* | 4/2015 | deCharms ............ H04W 4/021 |
| | | | 455/404.2 |
| 9,065,987 | B2* | 6/2015 | Kasmir ................ H04N 7/186 |
| 9,363,674 | B2* | 6/2016 | Altuwaiyan ........... H04W 4/21 |
| 9,741,236 | B2* | 8/2017 | Hess ................ G08B 25/008 |
| 10,062,273 | B2* | 8/2018 | Raji ...................... G08B 29/18 |
| 10,156,959 | B2* | 12/2018 | Fulker ................ G06F 3/04817 |
| 10,237,806 | B2* | 3/2019 | Cohn ................... G08B 29/02 |
| 10,326,921 | B2* | 6/2019 | Chien ................. H04N 5/2256 |
| 10,365,810 | B2* | 7/2019 | Sundermeyer ......... G08B 13/00 |
| 10,382,452 | B1* | 8/2019 | Dawes ................... H04L 63/02 |
| 10,389,736 | B2* | 8/2019 | Dawes ................... G05B 15/02 |
| 10,403,126 | B1* | 9/2019 | Morehead ............ G08B 27/001 |
| 10,514,837 | B1* | 12/2019 | Li ........................ G06F 3/0482 |
| 10,522,026 | B2* | 12/2019 | Sundermeyer ... G08B 13/19682 |
| 10,523,689 | B2* | 12/2019 | Decenzo ................ H04L 63/02 |
| 2002/0085030 | A1 | 7/2002 | Ghani |
| 2002/0091815 | A1 | 7/2002 | Anderson et al. |
| 2005/0146606 | A1 | 7/2005 | Karsenty et al. |
| 2006/0282886 | A1 | 12/2006 | Gaug |
| 2007/0100986 | A1 | 5/2007 | Bagley et al. |
| 2010/0138007 | A1 | 6/2010 | Clark et al. |
| 2010/0293027 | A1 | 11/2010 | Du Fosse |
| 2011/0184749 | A1 | 7/2011 | Stevens |
| 2011/0215923 | A1* | 9/2011 | Karim .................. G08B 25/006 |
| | | | 340/540 |
| 2011/0264686 | A1 | 10/2011 | Cavagnari et al. |
| 2011/0268263 | A1* | 11/2011 | Jones .................... H04M 3/563 |
| | | | 379/202.01 |
| 2012/0286951 | A1* | 11/2012 | Hess .................... G08B 25/008 |
| | | | 340/539.1 |
| 2014/0180711 | A1 | 6/2014 | Kamen et al. |
| 2014/0241695 | A1* | 8/2014 | Mohan .................... H04L 51/18 |
| | | | 386/234 |
| 2015/0125834 | A1 | 5/2015 | Tascon |
| 2015/0154854 | A1* | 6/2015 | Morehead ............. G08B 27/00 |
| | | | 340/501 |
| 2015/0168144 | A1 | 6/2015 | Barton et al. |
| 2015/0332569 | A1 | 11/2015 | Warzelhan et al. |
| 2015/0365246 | A1 | 12/2015 | Kane |
| 2016/0048312 | A1 | 2/2016 | Holaso |
| 2016/0155308 | A1 | 6/2016 | Mohan et al. |
| 2017/0352258 | A1* | 12/2017 | Hess .................... G08B 25/008 |
| 2018/0198788 | A1* | 7/2018 | Helen ................. H04L 12/2825 |

* cited by examiner

COLLABORATIVE ALARM MONITORING SYSTEM AND METHOD

CROSS-REFERENCE

This application is a National Stage of International Application No. PCT/US2017/040033, filed Jun. 29, 2017, which claims benefit of U.S. Provisional Application No. 62/356,886, filed Jun. 30, 2016, the disclosures of which are incorporated by reference herein in their entirety.

TECHNICAL FIELD

Various non-limiting embodiments relate generally to security systems, and more particularly, to a communication network-based security systems.

BACKGROUND

Conventional security systems typically require operators monitoring a security system to perform their communication and various dispatching tasks outside of the security monitoring system. For example, separate telephone calls are typically made in order to confirm possible security alert events and to determine whether various alert events have been acknowledged and resolved. Consequently, performing multiple handoffs results in the communication of duplicate or redundant information. In addition, process guidelines dictate a manual recording of alarm dispatch and resolution back into the security monitoring system, which is error prone and not timely.

SUMMARY

According to a non-limiting embodiment, a collaborative alarm monitoring system comprises a security system host server in signal communication with at least one security panel to receive an alert signal in response to a detected alarm event. A chat session server is in signal communication with the security system host server, and is configured to store a chat session protocol and software that when executed by a hardware processor executes a chat session. At least one monitoring device is in signal communication with the security system host server. The at least one monitoring device is configured to alert an operator of the alarm event in response to receiving the alert signal. The at least one monitoring device includes a chat session client in signal communication with the chat session server to generate a chat session interface that displays at least one alarm event thread indicative of the alarm event. The chat session server generates a communication stream for each alarm event, and the communication stream is individually displayed on the chat session interface of the at least one monitoring device.

According to another non-limiting embodiment, a method of monitoring an alarm system comprises establishing a chat session between a plurality of security monitoring devices, and receiving an alert signal in response to a detected alarm event. The method generates a chat session interface that displays at least one alarm event thread indicative of the alarm event, and generates a communication stream for each alarm event. The method further comprises displaying the communication stream individually on the chat session interface of the at least one monitoring device.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various non-limiting embodiments provide a collaborative alarm monitoring system configured to facilitate real-time alarm monitoring collaboration amongst system operators. The collaborative alarm monitoring system provides a chat session interface that allows operators to share a network-synchronized view of incoming alarms. According to at least one embodiment, any given alarm is assigned its own stream of communication that is displayed in the chat session interface to all monitoring operators. The operators can therefore perform various monitoring actions including, but not limited to, alerting of the alarm, discussing possible resolutions, "tagging" other operators to gain their attention, and/or instigate a notification to offline operators. The entire dispatch, routing chain, and resolution communication may be kept in a single system, and shared between operators. Accordingly, real-time alarm response workflow efficiency is improved while providing a richer data-set for future security analysis.

In addition, one or more operators may interact with one another via the chat session interface which is capable of operating on various platforms such as, for example, a personal computer (PC), mobile terminal device, smart phone, and/or tablet computer. The chat interface facilitates the collaboration of one or more operators to monitor alarm events in real-time. In this manner, a single collaborative space is created for all related alarm communication to be shared, consumed, analyzed, and acted upon while surfacing relevant activity in a team environment. Accordingly, an audited location for the recording of all activities related to alarm events may be provided. In addition, the collaborative alarm monitoring system facilitates real-time feedback to all system operators about alarm activity, which increases the likelihood of faster alarm resolutions, with a reduced risk of errors and duplicated efforts.

Figure 1:
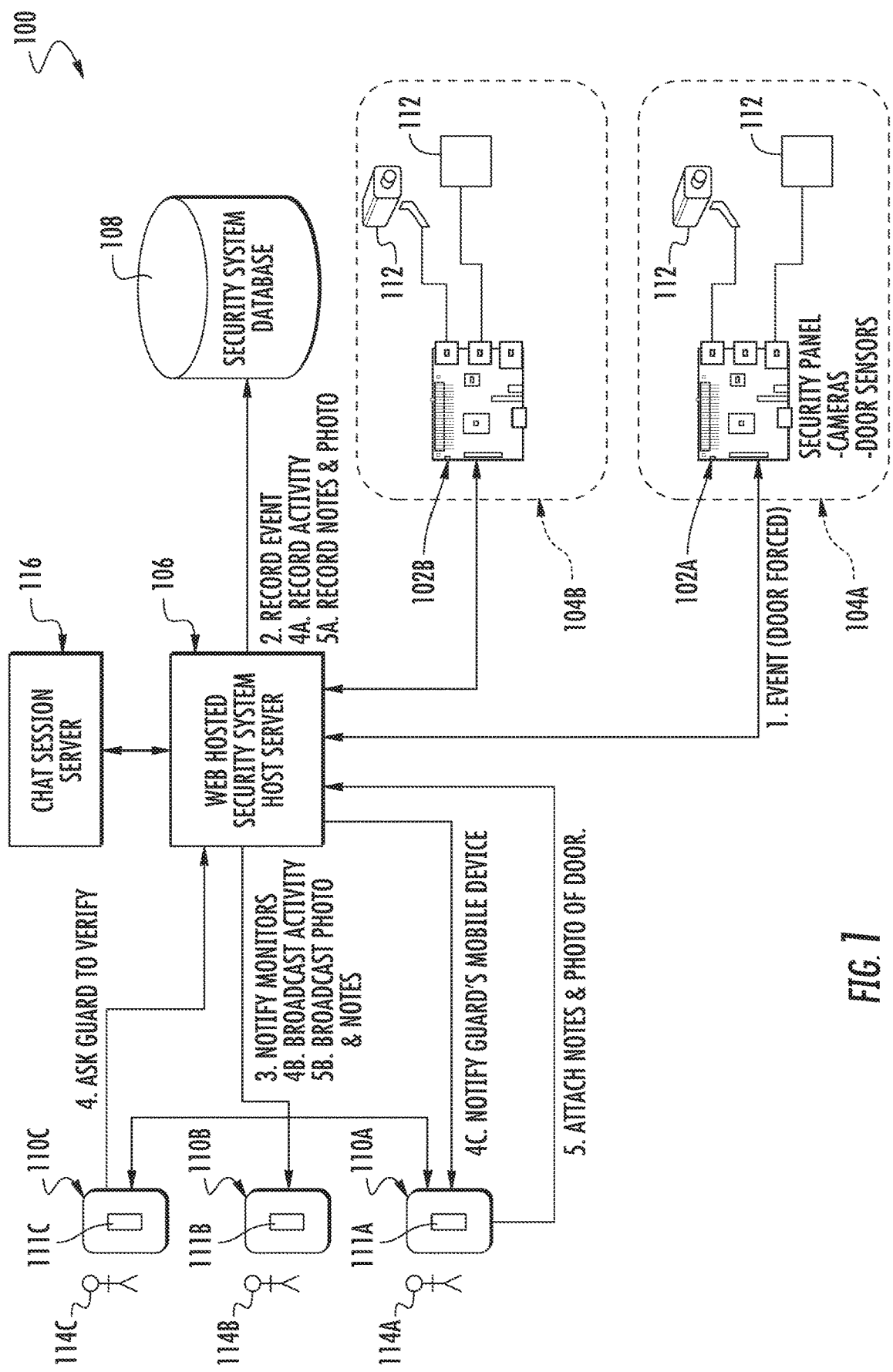
FIG. 1 illustrates a collaborative alarm monitoring system according to a non-limiting embodiment.

Referring now to FIG. 1, a collaborative alarm monitoring system 100 is illustrated according to a non-limiting embodiment. The collaborative alarm monitoring system 100 includes at least one security panel 102a-102b located at a respective secured area 104a-104b, a security system host server 106, a security system data base 108, and at least one monitoring device 110a-110c. The security panel 102a-102b is in signal communication with at least one security device 112 configured to detect an alarm event in a respective secured area 104a-104b and may output an alert signal in response to detecting the alarm event. The security device 110a-110c includes, but is not limited to, a security camera and a sensor. The sensor includes, for example, a motion sensor, a force sensor, etc.

The security system host server 106 is in signal communication with one or more of the security panels 102a-102b. According to at least one embodiment, the security system host server 106 is configured as a web-based security system host server 106 capable of wirelessly communicating with the security panels 102a-102b, the security data base 108 and the monitoring devices 110a-110c via a cloud-based wireless network as understood by one of ordinary skill in the art.

The security system host server 106 is configured to receive the alert signal from one or more security panels 102a-102b and to perform at least one security activity in response to the alert signal. The at least one security action includes, but is not limited to, recording the alarm event in the security system data base 108, outputting an event notification signal indicative of the alarm event, recording the at least one security activity in the security system data base 108, outputting an activity notification signal indicative of the performed at least one security activity, recording metadata associated with the alarm event in the security data base 108, and outputting a metadata signal indicative of the recorded metadata. The metadata includes, but is not limited to, notes, audio and/or images of the alarm event.

The monitoring device 110a-110c is in signal communication with the security system host server 106. The monitoring device 110a-110c may include various electronic computing devices including, but not limited to, a computer workstation, personal computer (PC), terminal device, smart phone, smart watch, and tablet computer. In at least one embodiment, the monitoring device 110a-110c is configured to alert one or more operators 114a-114c of the alarm event in response to receiving the alert signal. Following detection of an alarm event, the system host server 106 may output the metadata associated with the alarm event to one or more monitoring devices 114a-114c. The metadata includes, but is not limited to, notes, timestamps, location data, audio and/or images of the alarm event, which may be displayed on a monitoring device 110a-110c. The host server 106 may then command the monitoring device 110a-110c to generate a physical alert requesting the operator 114a-114c to verify acknowledgment of the alarm event. The physical alert may include, for example, a sound, vibration, graphic and/or illumination.

The collaborative alarm monitoring system 100 further includes a chat session server 116 in signal communication with the security system host server 106. Although the chat session server 116 is illustrated as being located separately from the security system host server 106, it should be appreciated that the chat session server 116 may be integrated with the security system host server 106 without departing from the scope of the invention. The chat session server 116 stores operator information such as, for example, names, titles, locations, images, etc., of all operators registered with the chat session server 116 and capable of participating in a chat session. The chat session server 116 also stores chat session protocols and software that, when executed by a hardware processor, generates a chat session on the at least one monitoring device 110a-110c. The hardware processor may be located in a cloud server (not shown) or on an individual monitoring device 110a-110c. The chat session server 116 may also include a local hardware processor that performs various logical decisions, chat session monitoring actions, and command outputs based on commands input by one or more operators 114a114c during the chat session. In at least one embodiment, the chat session includes a chat session interface (not shown in FIG. 1) that allows an operator 114a-114c to interact with one or more security panels 102a-102b and one or more operators 114a-114c. Accordingly, the chat session server 116 may monitor and control the chat session interface based on the real-time activities and inputs of the operators 114a-114c. The chat session interface is described in greater detail below.

According to at least one non-limiting embodiment, the security system host sever 106 determines at least one monitoring device 110a-110c connected to the security system host server 106. The security system host server 106 further connects the at least one monitoring device 110a-110c to the chat session sever 116 such that the chat session is generated on each connected monitoring device 110a-110c. In this manner, a first operator (e.g. 110a) can communicate with one or more other operators (e.g., 110b-110c) via the chat session.

Turning now to FIGS. 2A-2D, various chat session interfaces 200a-200c generated by the collaborative alarm monitoring system 100 are illustrated according to a non-limiting embodiment. Each chat session interface 200a-200c may be dynamically selected (e.g., by an individual operator) to provide different modes for viewing various alarm events and interacting with an on-going chat session.

Figure 2A:
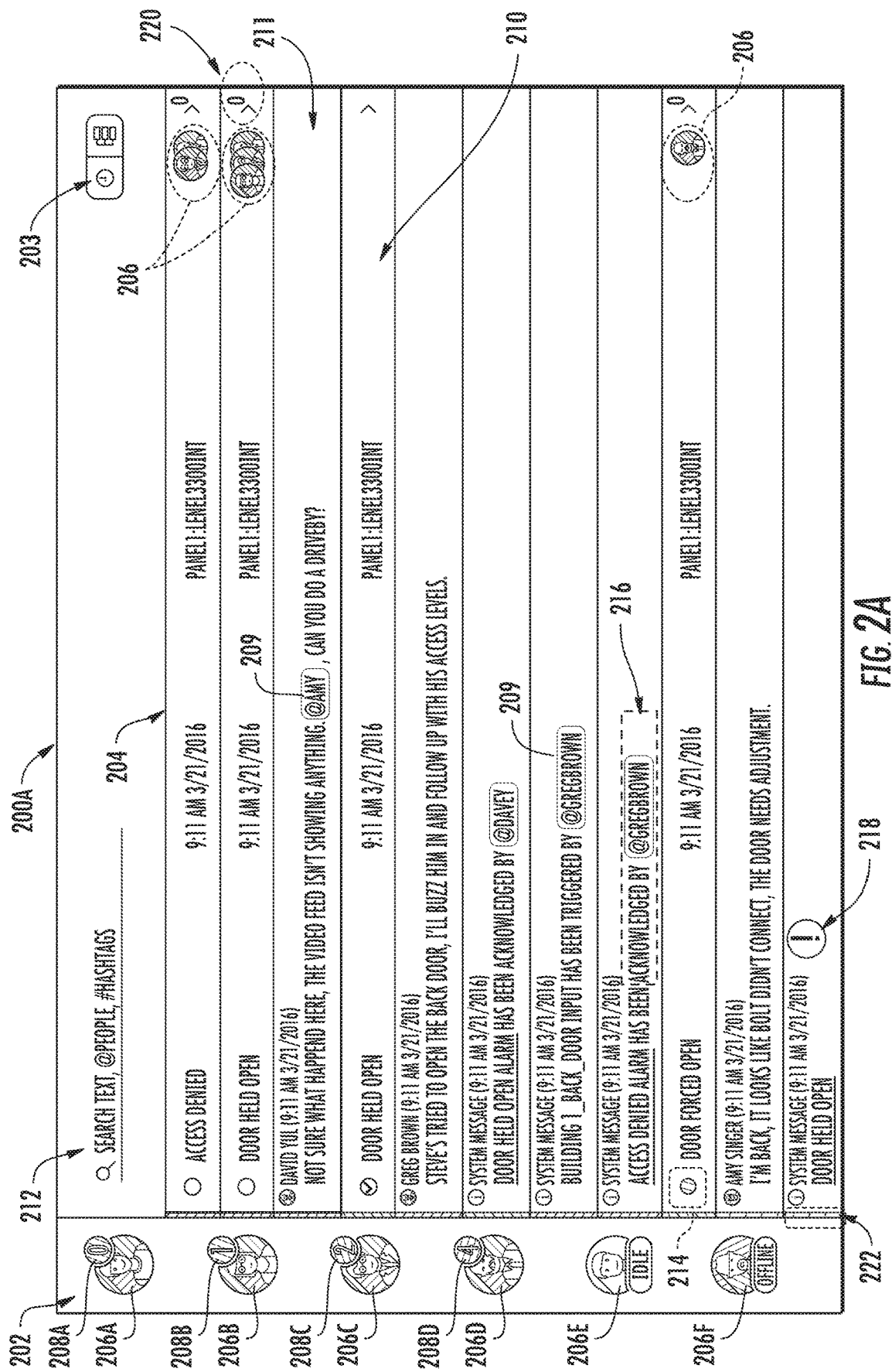
FIG. 2A illustrates a chat interface operating in an all-activity viewing mode generated by a collaborative alarm monitoring system according to a non-limiting embodiment.

Referencing first FIG. 2A, an all-activity interface 200a is illustrated according to a non-limiting embodiment. The all-activity interface 200a includes a participant display region 202 and a threaded display region 204 to provide a view of all activities associated with the alarm monitoring system 100. A mode switching element 203 is also provided which allows an operator to switch between the different chat session interface 200a-200c.

The participant display region 202 displays graphical operator icons 206a-206f. The graphical operator icons 206a-206f are associated with a corresponding operator's monitoring device that is connected to the chat session server, i.e., "logged-in" to an on-going chat session. Although the participant display region 202 is illustrated as extending vertical along a side-portion of the chat interface 200a, the location is not limited thereto. For example, the participant display region 202 may extend horizontally along the bottom-portion of the chat interface 200a.

The appearance of the graphical operator icons 206a-206f may be dynamically manipulated (i.e., changed by the chat session server) to indicate the status of a respective operator. For instance, a graphical operator icon 206a may appear in full color indicating that a respective operator is currently active and able to participate in the chat session. A graphical operator icon 206e may appear also transparent to indicate that an operator is idle while a grayed-out graphical operator icon 206f indicates that a respective operator is currently unavailable or unable to participate in the chat session. The graphical operator icons 206a-206f may include, for example, a personal image of the individual operator.

Each graphical operator icon 206a-206f may also include an event participant counter 208a-208f which indicates a number of alarm events a respective operator is currently addressing. As an operator is assigned a new alarm event or indicates that they are attending to a particular alarm event, the chat session server increments the individual operator's event participant counter 208a-208f. Likewise, as an operator closes out an alarm event or indicates that an alarm event has been resolved, the chat session server decrements the individual operator's event participant counter 208a-208f.

The chat session server may also alter the appearance of the event participant counter 208a-208f based on the number of alarm events assigned or handled by a particular operator. For example, the number of alarm events indicated by the event participant counter 208a-208f may be compared to one or more threshold values. As the number indicated by the event participant counter 208a-208f increases, the color of the event participant counter 208a-208f is changed. For instance, a green-colored event participant counter 208a may indicate that an operator is handling a low number of alarm events, a yellow-colored event participant counter 208c may indicate that the operator is handling a moderate number of alarm events, and a red-colored event participant counter 208d may indicate that the operator is handling an excessive number of alarm events. In this manner, all operators participating in the chat session are made aware of each other's real-time work load and can direct questions or inquiries to those operators participating in a low-number of alarm events, without overloading operators participating in an excessive number of alarm events. Accordingly, the efficiency of alarm event monitoring may be improved.

The threaded display region 204 includes one or more searchable alarm event threads 210 and one or more searchable conversation entry threads 211. A query field 212 is provided which allows operators to input text in search for a particular alarm event, conversation entry, time stamp, operator, security device, or video feed.

The alarm event threads 210 include a reviewable timeline of alarm events. Each alarm event thread 210 displays all communication information related to the alarm event, while each conversation entry thread 211 includes conversation information associated with a conversation entry input by a respective operator. The communication information related to the alarm event includes, but is not limited to, the type of alarm event or security breach (e.g., "door forced open"), a time/date at which the alarm event occurred, the security panel which detected the alarm event, identification of one or more security devices that detected the alarm event, and/or the secured area at which the alarm event occurred. The alarm event thread 110 also displays the graphical operator icons 206 of one or more operators currently addressing the respective alarm event.

The conversation information includes, but is not limited to, a textual statement or inquiry, the name or identification of the operator associated with the statement/inquiry, and a time/date at which the statement/inquiry was submitted to the chat session. According to a non-limiting embodiment, the all-activity interface 200a displays a listing of chronological activity related to the management of a respective alarm event by the operators. The chronological activity includes a chronological list of alarm event threads 210 and conversation entry threads 211 arranged sequentially according to their respective time stamp. The conversation information also includes a tag 209 that may be input by the operator when submitting a statement or inquiry. As described above, the operator may input the tag 209 so as to associate the respective conversation entry thread 111 with a particular alarm event, operator, security device, video feed, etc.

The alarm event thread 210 further includes an urgency priority icon 214, an action taken indicator 216, a status check icon 218, a progress activity indicator 220, and a related event indicator 222. The urgency priority icon 214 may include a graphical icon indicating the urgency of the alarm event. The chat session server 116 may be made aware of different priorities assigned to different alarm events and then display a unique icon (e.g., particular color icon) corresponding to the detected alarm event. Accordingly, operators may dynamically prioritize which alarm events to resolve.

The action taken indicator 218 indicates a particular action (e.g., alarm acknowledged, door input triggered, door re-locked, etc.) performed by an operator that has addressed an alarm event. In at least one embodiment, the action taken indicator 216 may be input by the operator. In response to receiving the input, the chat session server 116 displays the corresponding action taken in the alert event thread 110. The status check icon 218 may be displayed after the chat session server 116 has determined that a particular alarm event thread 110 has not been acknowledged or no action has been taken by any of the operators after a predetermined amount of time has elapsed following the announcement of the alarm event. Once an operator submits the action taken, the status check icon 218 may be removed. The progress activity indicator 220 may be displayed in a particular alarm thread and/or conversation entry thread when the chat session server 116 has detected recent activity related to the respective thread.

The related event indicator 222 may tie together multiple alarm events, and therefore may visually assist operators in identifying which alarm events are related to one another. For instance, alarm threads 110 having a common related event indicator 222 may be deemed to be related. For example, a door open alert event and window open alert event may be assigned the same related event indicator 222 (i.e., tied together) to indicate that the two alarm events resulted from a common security breach. The related event indicators 222 can be set by an operator similar to the action taken indicator 216 described above.

Figure 2B:
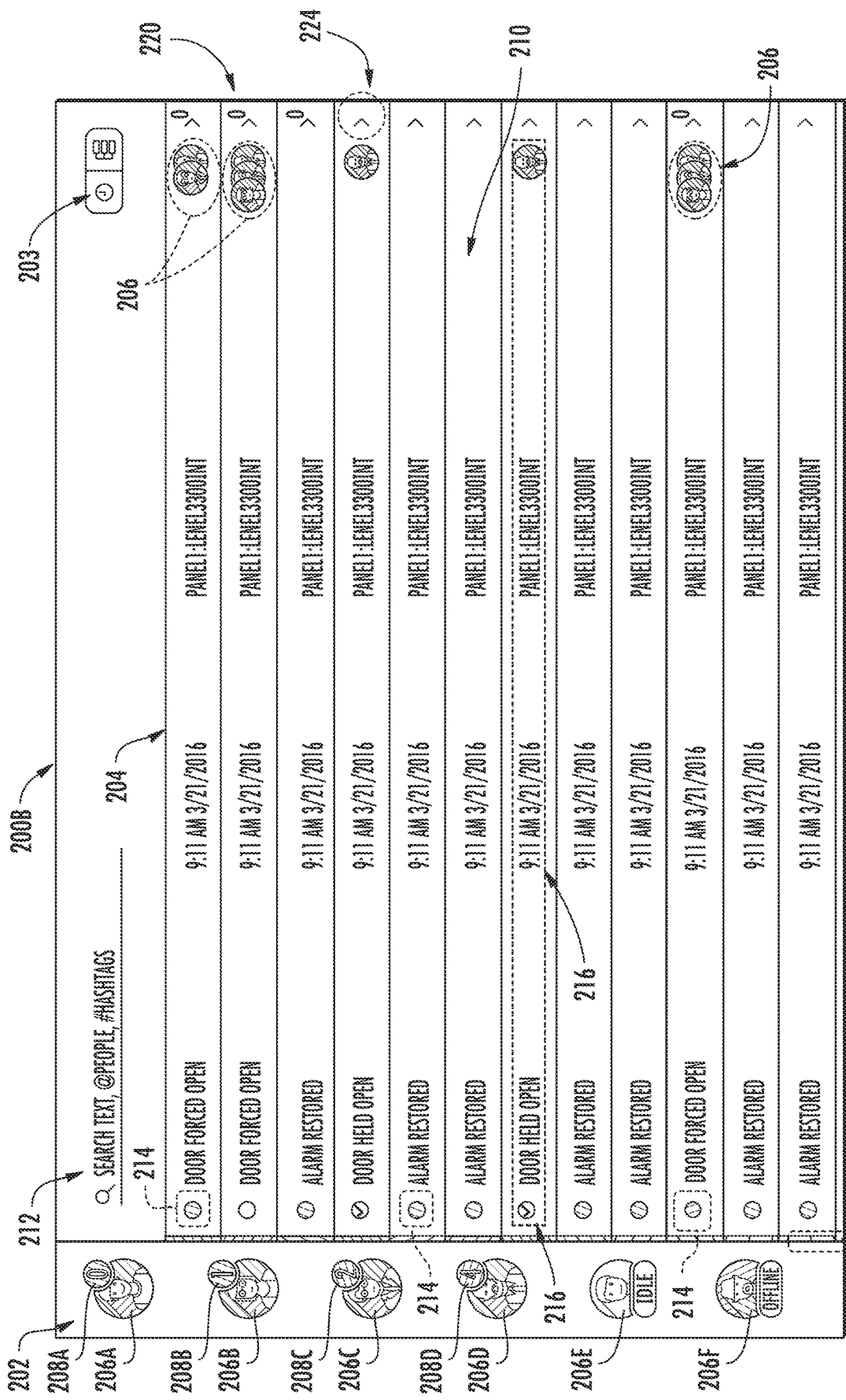
FIG. 2B illustrates a chat interface operating in an all-alarm viewing mode generated by a collaborative alarm monitoring system according to a non-limiting embodiment.

With reference to FIG. 2B, an all-alert interface 200b is illustrated according to a non-limiting embodiment. The all-activity interface 200a can be switched into the all-alert interface by manipulating the mode switching element 203. The all-alert interface 200b provides a condensed view of the chat session by displaying only the alarm event threads 210 in chronological order. In this manner a simpler view is provided that emphasizes alarm events as they are registered with the system 100 while minimizing operator conversation regarding the various alarm events. The alarm event threads 210, however, can be expanded in order to view all the activities (e.g., conversation entries) associated with the expanded alarm event thread 210. An expansion icon 224 is displayed in an alert thread 210 to inform operators that a particular alert event thread 110 can be expanded. Although some graphical alerts described above are not illustrated in FIG. 2B, it should be appreciated that the alert thread events 110 listed in the all-alert interface 200b can display all the various graphical alerts and indicators included with the all-activity interface 200a.

Figure 2C:
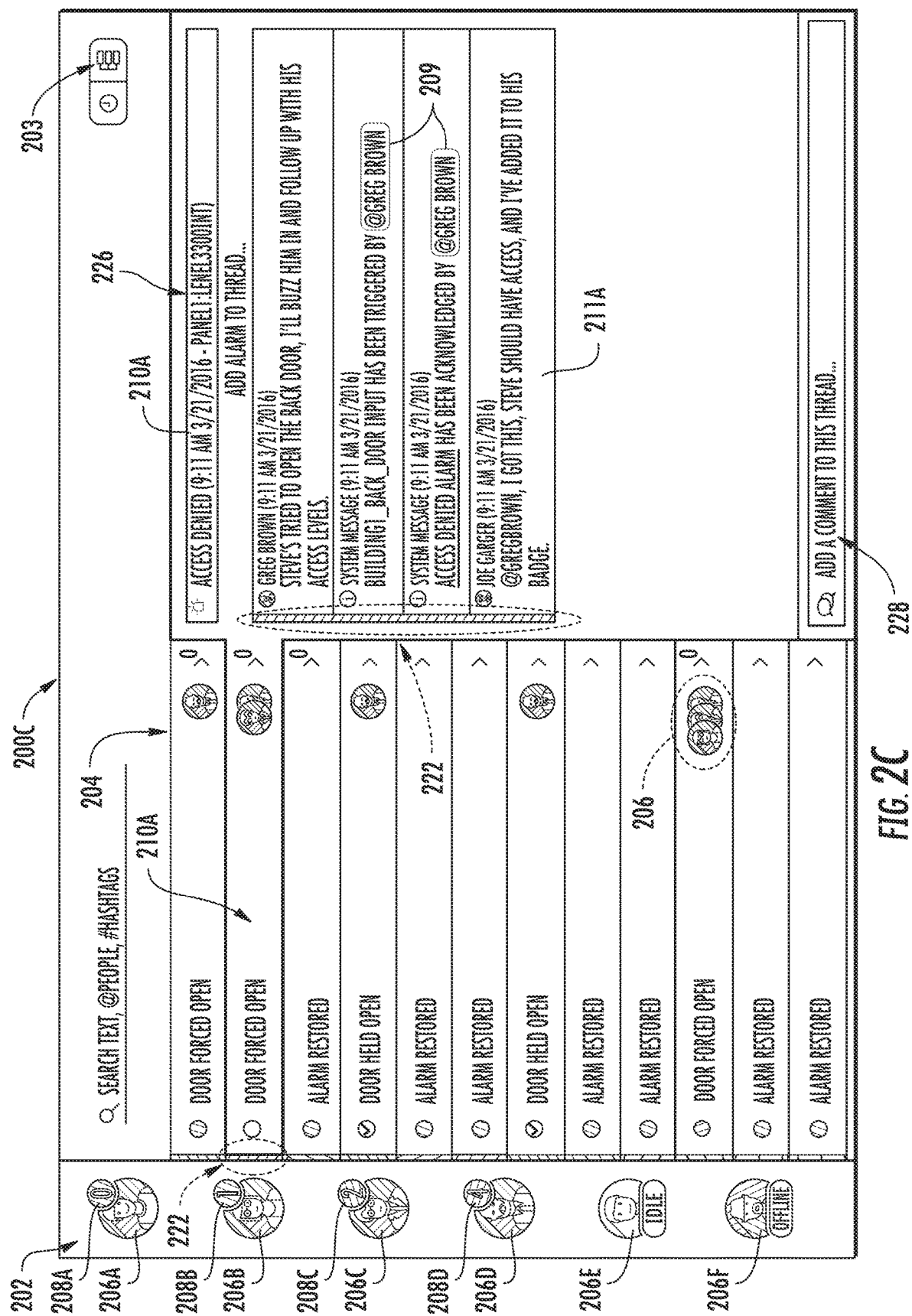
FIG. 2C-2D illustrates a chat interface operating in a single-thread alarm viewing mode generated by a collaborative alarm monitoring system according to a non-limiting embodiment.
Figure 2D:
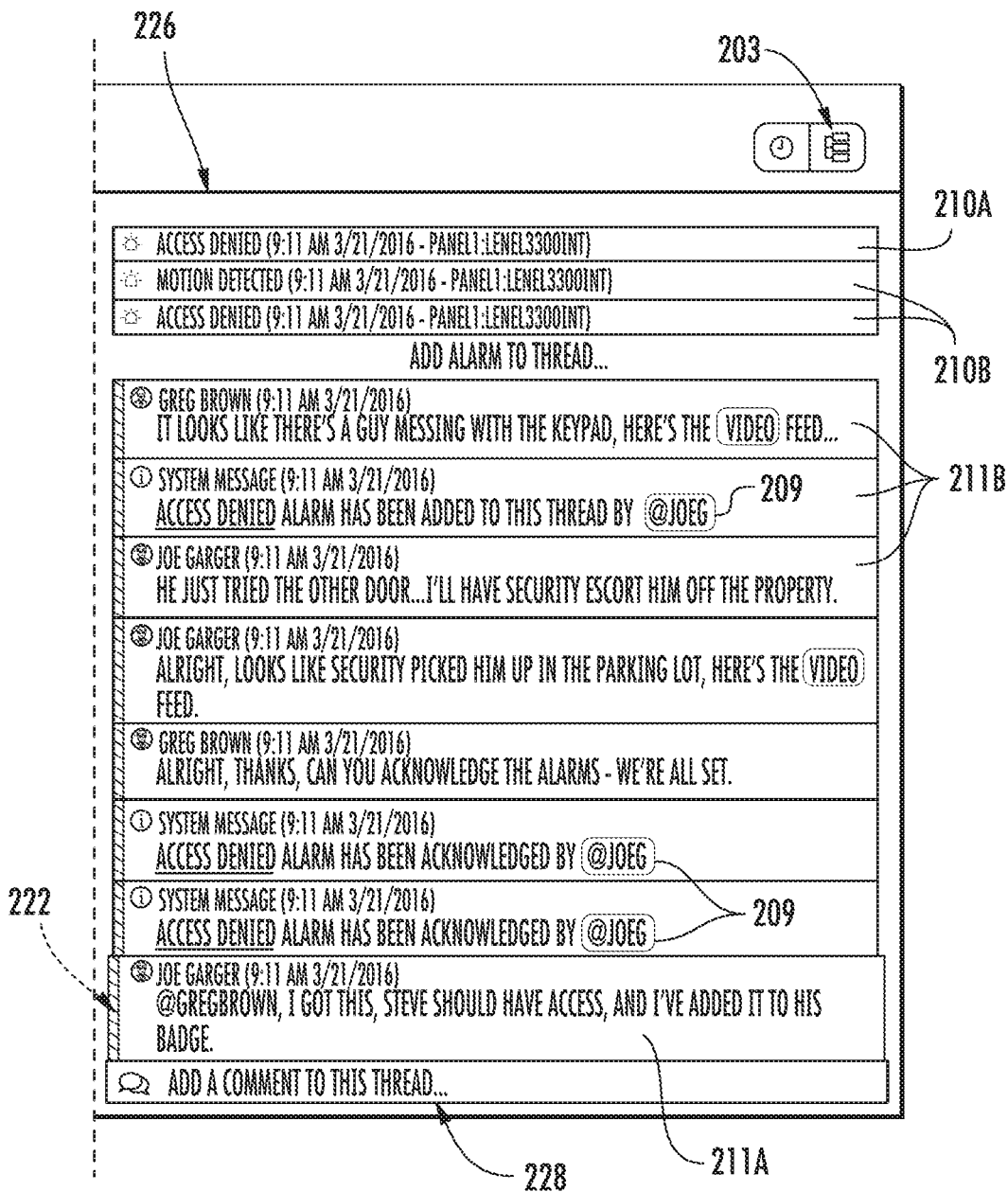

Referring to FIGS. 2C-2D, a single-thread interface 200c is illustrated according to a non-limiting embodiment. The single-thread interface 200c includes a related thread region 226. The single-thread interface 200c can be invoked using the mode switching element 203 described above. The single-thread interface 200c provides a view that displays only activity related to one or more related alarm events (i.e., alarm events that are tied together). In this manner, operators can view the activity of individual alarms events and determine their status, or tie together one or more alarm events using the related event indicator 222 and/or tags 209 to create a thread that represents a single real-world alarm event, which may involve the occurrence multiple individual alarm events or security breaches.

Still referring to FIGS. 2C-2D, alarm event 210a, for example, is selected from the threaded display region 204. In response to selecting the alarm event 210a, a detailed alarm event thread 210a is displayed in the related thread region along with any current related alarm events 210a and/or conversation entry threads 211a. An operator may then enter a text string including a tag 209 in the tag entry field 228. When the newly entered tag 209 matches tags previously assigned to other alarm events and/or conversation entry threads 211, the chat client server may compare the newly submitted tag to the tags of the threads already included in the related thread region 226. When the newly entered tag matches the tags previously assigned to the previously displayed threads 210a/211a, the chat client server updates the related thread region 226 with newly added threads as shown in FIG. 2D. For instance, after inputting one or more new tags, the related thread region 226 is updated with new alarm events 210b and new conversation threads 211b.

As described in detail above, various non-limiting embodiments provide a collaborative alarm monitoring system configured to facilitate real-time alarm monitoring collaboration among system operators by sharing a network-synchronized view of incoming alarms. According to at least one embodiment, any given alarm is assigned its own stream of communication that is visible to all monitoring operators via a chat session interface. The operators can therefore perform various monitoring actions including, but not limited to, alerting of the alarm, discussing possible resolutions, "tagging" other operators to gain their attention, and/or instigate a notification to offline operators. In this manner, a more efficient real-time alarm response workflow is achieved, and a richer data-set is presented to the operators for future security analysis.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A collaborative alarm monitoring system, comprising:
   a security system host server in signal communication with at least one security panel to receive an alert signal in response to a detected alarm event;
   a chat session server in signal communication with the security system host server, the chat session server configured to store a chat session protocol and software that when executed by a hardware processor executes a chat session; and
   at least one monitoring device in signal communication with the security system host server, the at least one monitoring device configured to alert an operator of the alarm event in response to receiving the alert signal, the at least one monitoring device including a chat session client in signal communication with the chat session server to generate a chat session interface that displays at least one alarm event thread indicative of the alarm event, wherein the chat session server generates a communication stream for each alarm event, and the communication stream is individually displayed on the chat session interface of the at least one monitoring device,
   wherein the chat session server determines a first tag corresponding to a first alarm event and a second tag corresponding to a second alarm event different from the first alarm event, and determines the first and second alarm events are related when the first tag matches the second tag.

2. The collaborative alarm monitoring system of claim 1, wherein the chat session interface displays at least one of an alarm event thread that displays information regarding the alert event.

3. The collaborative alarm monitoring system of claim 2, wherein the chat session interface displays a plurality of alarm event threads and a plurality of conversation entry threads, the conversation entry threads input by the operator via the at least one monitoring device.

4. The collaborative alarm monitoring system of claim 3, wherein the chat session server assigns time stamps to the alarm event threads and the conversation entry threads, and commands the client session interface to list the alarm event threads and conversation entry threads in chronological order with respect to one another.

5. The collaborative alarm monitoring system of claim 2, wherein the at least one alarm event thread includes a plurality of visual indicator corresponding to each alarm event.

6. The collaborative alarm monitoring system of claim 5, wherein visual indicators includes a first indicator identifying a type of security breach and a second indicator identifying whether a respective alarm event thread has been acknowledged by at least one of the operators.

7. The collaborative alarm monitoring system of claim 1, wherein the communication stream includes at least one of a conversation, an image, and operator identification information identifying the operator involved in responding to the at least one alarm event.

8. The collaborative alarm monitoring system of claim 1, wherein the chat interface is operable in a plurality of different viewing modes.

9. The collaborative alarm monitoring system of claim 8, wherein the plurality of different viewing modes includes a single-thread viewing mode interface that displays the related alarm events having matching tags.

10. The collaborative alarm monitoring system of claim 9, wherein the chat session server determines at least one related conversation entry thread is related to the alarm event thread when a tag of the conversation entry thread matches the tag of the alarm entry thread.

11. The collaborative alarm monitoring system of claim 10, wherein the single-thread viewing mode interface includes a related thread region, and wherein the chat session data server displays only alert event threads and the conversation entry thread having matching tags in the related thread region.

12. The collaborative alarm monitoring system of claim 11, wherein the single-thread viewing mode interface includes a tag entry field that assigns at least one tag to at least one of an alert event thread and a conversation entry thread, and wherein the chat session data server automatically updates the related thread region with at least one of a new alert event thread and a new conversation entry thread in response to receiving a new tag that matches a tag assigned to an alert entry event or conversation entry thread previously displayed in the related thread region.

13. The collaborative alarm monitoring system of claim 1, wherein the chat session interface includes a participant display region that displays graphical operator icons associated with a corresponding monitoring device that is connected to the chat session server.

14. The collaborative alarm monitoring system of claim 13, wherein each of the graphical operator icons include an event participant counter, and wherein the chat session server determines a number of alarm events in which a respective operator participates, and controls the event participant counter to display the number of participating alarm events corresponding to each operator.

15. A method of monitoring an alarm system, the method comprising:
   establishing a chat session between a plurality of security monitoring devices;
   receiving an alert signal in response to a detected alarm event;
   generating a chat session interface that displays at least one alarm event thread indicative of the alarm event;
   assigning a first tag to a first alarm event via the chat session interface and assigning a second tag to a second alarm event different from the first alarm event via the chat session interface;
   determining that the first alarm event is related to the second alarm event when the first and second tags match;
   generating a communication stream for the first and second alarm events; and
   displaying the communication stream individually on the chat session interface of the at least one monitoring device,
   wherein the displaying further comprises displaying only the first and second alarm events in a related thread region of the chat session interface.

16. The method of claim 15, further comprising displaying, via the chat session interface, at least one of an alarm event thread that displays information regarding the alert event.

17. The method of claim 16, further comprising receiving a plurality of conversation entry threads input by operators via the plurality of security monitoring devices, and displaying, via the chat session interface, a plurality of alarm event threads and the plurality of conversation entry threads.

18. The method of claim 17, further comprising assigning time stamps to the alarm event threads and the conversation entry threads, and displaying, via the chat session interface, the alarm event threads and conversation entry threads in chronological order with respect to one another.

* * * * *